Jan. 1, 1924. 1,479,685

E. WARD

VEHICLE TRAFFIC SIGNAL

Filed Jan. 19, 1923  2 Sheets-Sheet 1

Inventor
E. Ward.
By *[signature]*, Attorney

Jan. 1, 1924 1,479,635
E. WARD
VEHICLE TRAFFIC SIGNAL
Filed Jan. 19, 1923  2 Sheets-Sheet 2

Inventor
E. Ward.
By
Attorney

Patented Jan. 1, 1924.

1,479,685

UNITED STATES PATENT OFFICE.

ERNEST WARD, OF INDEPENDENCE, MISSOURI.

VEHICLE TRAFFIC SIGNAL.

Application filed January 19, 1923. Serial No. 613,700.

*To all whom it may concern:*

Be it known that I, ERNEST WARD, a citizen of the United States, residing at Independence, in the county of Jackson and State of Missouri, have invented certain new and useful Improvements in Vehicle Traffic Signals; and I do hereby declare the following to be a full, clear, and exact description of the invention, such as will enable others skilled in the art to which it appertains to make and use the same.

The invention relates to vehicular signal means whereby the driver of a motor vehicle may signal his intention when about to stop, turn to the right or left, slow down, speed up or go, so that the driver of a following vehicle may govern himself accordingly and thereby avoid a casualty.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Corresponding and like parts are referred to in the following description and designated in the several views of the drawings by like reference characters.

Figure 1:
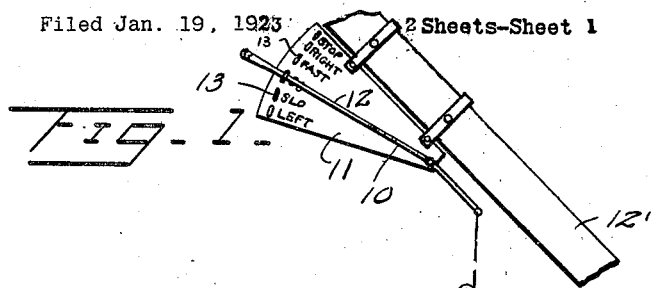
Figure 1 is a diagrammatic view illustrative of the invention.
Figure 5:
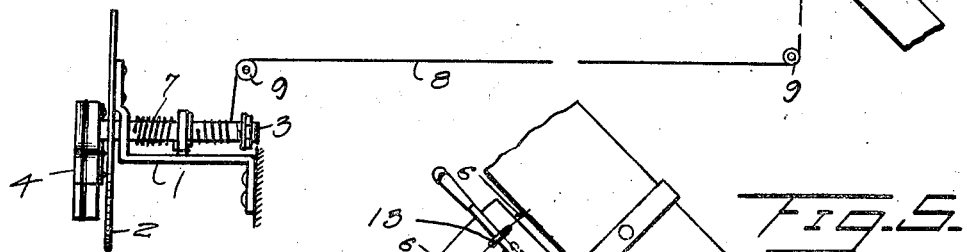
Figure 5 is a detail view of the means for operating a signal.
Figure 5:
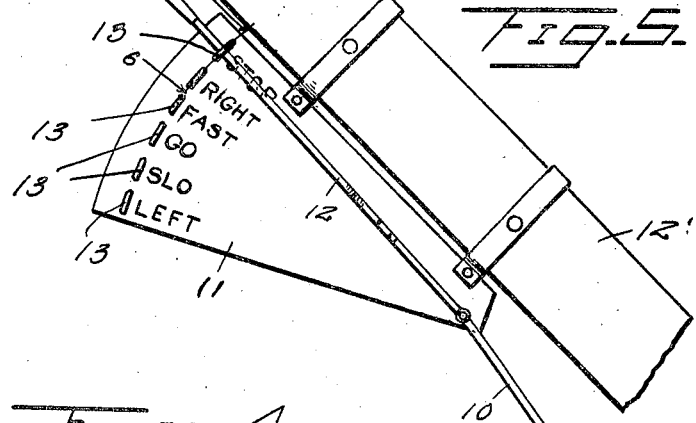
Figure 4:
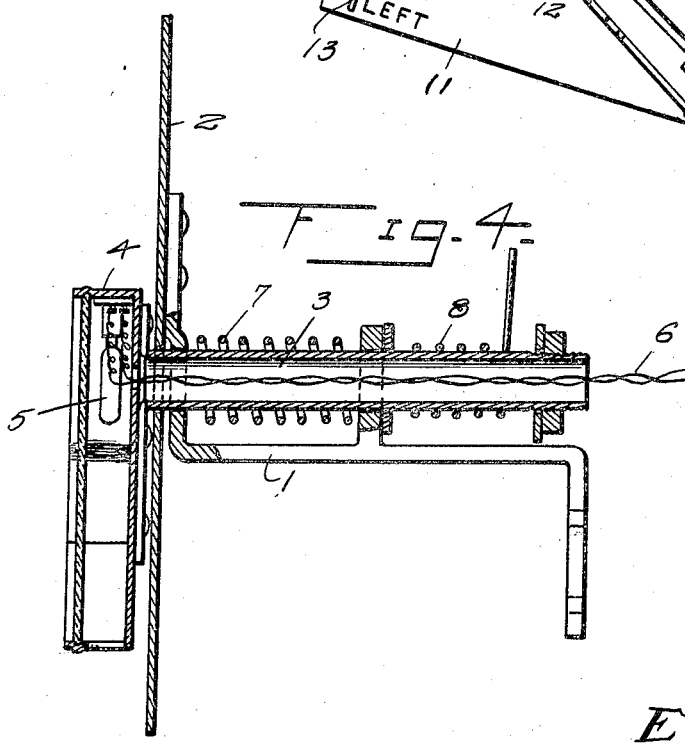
Figure 4 is a sectional detail.
Figure 6:
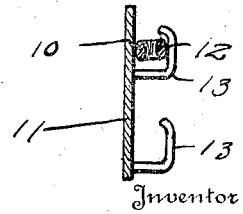
Figure 6 is a section on the line 6—6 of Figure 5 looking in the direction of the arrows.
Figure 2:
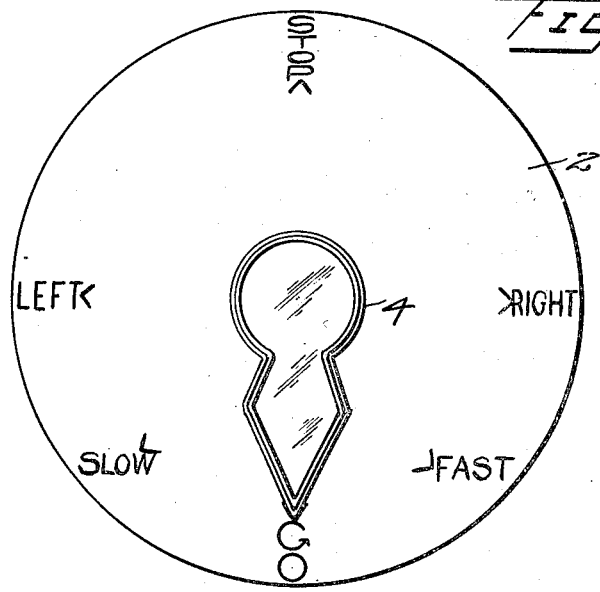
Figure 2 is a front view of the signal.
Figure 3:
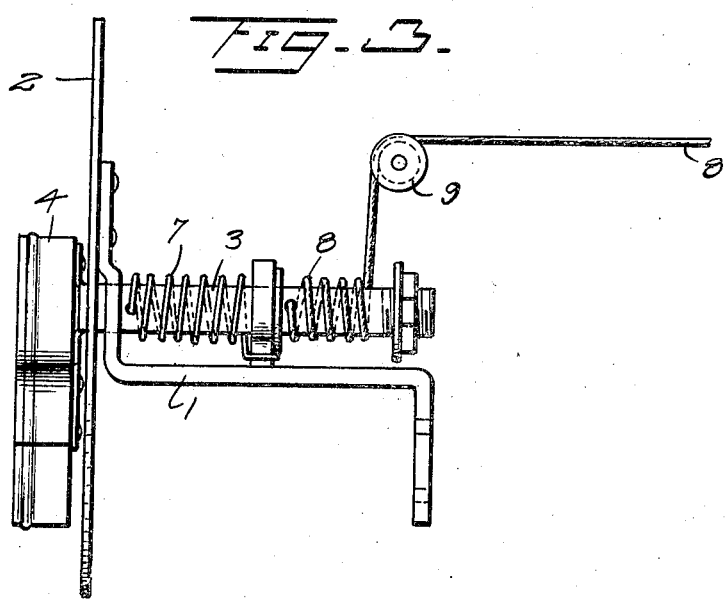
Figure 3 is a side view thereof.

The numeral 1 designates a bracket which is adapted to be secured to the vehicle in the most advantageous position. A dial 2 is attached to the bracket 1 and is supported thereby and is provided on its face with words, such as "Go", "Fast", "Right", "Stop", "Left" and "Slow", to designate the intention of the driver when about to stop, go, turn to the left or right, slow down or speed up. A hollow shaft 3 is mounted upon the bracket 1 and passes through the dial 2 and is provided at its front end with an indicator or hand 4 which is hollow to contain a lamp 5 which is adapted to shed its rays of light through the outer end of the indicator or hand which is open for this purpose. The rays of light thus projected will illuminate the word opposite the indicator or hand so that the same may be readily observed after dark. The lamp 5 is of the electric type and current is supplied thereto by means of a wire 6 leading from a suitable source of supply. The shaft 3 is rotatable so as to move the hand 4 carried thereby over the face of the dial 2. A spring 7, coiled about the shaft 3, is secured at one end thereto and at its opposite end to the bracket 1 and this spring normally holds the shaft 3 in position with the indicator 4 pointing to the word "Go" on the dial 2.

The shaft 3 may be rotated in any manner and to admit of its operation from a distant point, a cord 8 or like flexible connection is wound about the shaft 3 and, after passing around a suitable guide 9, is connected to a member 10 within convenient reach of the driver so as to be operated when required to bring the hand 4 to the required position on the dial 2 to designate the intention of the driver when about to turn, stop or vary the speed of the machine. The position of the operating member will be determined by suitable indicia corresponding with that appearing on the face of the dial 2.

For convenience a plate 11 is clipped or otherwise secured to the steering column 12 and the member 10 is pivoted thereto and provided with a latch 12ª which is adapted to engage over a series of hooks 13 applied to the plate 11 and hold the lever in the required adjusted position. The words, Stop, Right, Fast, etc., corresponding with the words on the dial 2 are opposite the respective hooks 13 and when the lever 10 is moved to a position opposite a selected word on the plate 11, the hand 4 is moved and points to a like word on the dial 2.

What is claimed is:

A signal of the class described including a bracket provided with spaced upstanding bearings, a shaft journaled in said bearings, an indicator carried on said shaft beyond one of the bearings, a dial coacting with said indicator and in which said shaft is journaled, said dial being located intermediate the indicator and adjacent bearing and secured to the bracket, the other end of the shaft extending beyond the other bearings, operating mechanism connected to the shaft at the latter end, and a return spring for the shaft surrounding the same and located intermediate the bearings.

In testimony whereof I affix my signature in presence of two witnesses.

ERNEST WARD.

Witnesses:
ROBT. C. MURPHY,
H. G. COOK.